US 8,947,861 B2

(12) United States Patent
Staats et al.

(10) Patent No.: US 8,947,861 B2
(45) Date of Patent: *Feb. 3, 2015

(54) TABLET COMPUTER

(75) Inventors: Kai Staats, Loveland, CO (US); Leonard Roach, South Jordan, UT (US); Christopher Miller, Draper City, UT (US)

(73) Assignee: Over the Sun, LLC, Loveland, CO (US)

( * ) Notice: Subject to any disclaimer, the term of this patent is extended or adjusted under 35 U.S.C. 154(b) by 321 days.

This patent is subject to a terminal disclaimer.

(21) Appl. No.: 13/480,768

(22) Filed: May 25, 2012

(65) Prior Publication Data
US 2012/0236485 A1    Sep. 20, 2012

Related U.S. Application Data

(63) Continuation of application No. 12/415,944, filed on Mar. 31, 2009, now Pat. No. 8,208,245.

(60) Provisional application No. 61/041,093, filed on Mar. 31, 2008.

(51) Int. Cl.
G06F 1/16    (2006.01)

(52) U.S. Cl.
CPC .............. *G06F 1/1656* (2013.01); *G06F 1/162* (2013.01); *G06F 1/1643* (2013.01); *G06F 1/1654* (2013.01)
USPC .................................. 361/679.02; 361/679.55

(58) Field of Classification Search
CPC ..... G06F 1/162; G06F 1/1656; G06F 1/1654; G06F 1/1643
See application file for complete search history.

(56) References Cited

U.S. PATENT DOCUMENTS

| 5,708,560 A | * | 1/1998 | Kumar et al. ............ 361/679.17 |
| 5,822,539 A | | 10/1998 | van Hoff |
| 5,871,094 A | | 2/1999 | Leibowitz |
| 6,141,438 A | | 10/2000 | Blanchester |
| 6,147,773 A | | 11/2000 | Taylor et al. |

(Continued)

FOREIGN PATENT DOCUMENTS

EP    0950992 A2    10/1999

OTHER PUBLICATIONS

International Searching Authority, International Search Report and Written Opinion, for PCT/US2009/039021, dated Nov. 17, 2009.

(Continued)

*Primary Examiner* — Lisa Lea Edmonds
(74) *Attorney, Agent, or Firm* — HolzerIPLaw, PC

(57) ABSTRACT

A tablet computer is composed of a tablet component and a keyboard component. The tablet component houses all of the essential hardware of tablet computer including the central processing unit (CPU), the memory, the power supply, and a touch screen display. The keyboard component is a simple peripheral device that offers no computing functionality unless connected with the tablet component. The tablet component and keyboard component can mate to form a notebook-type computer. The tablet component and keyboard component can mate in an orientation allowing use of only a tablet computing user interface. The tablet component is removable from the keyboard component and functions independently as a tablet computing device. The keyboard component has a counterbalance armature to oppose the moment of inertia due to the changing center of mass of the tablet computer as the tablet component is moved from a closed to an open position.

20 Claims, 14 Drawing Sheets

(56) References Cited

U.S. PATENT DOCUMENTS

| | | | |
|---|---|---|---|
| 6,157,958 A * | 12/2000 | Armitage et al. | 709/250 |
| 6,282,082 B1 * | 8/2001 | Armitage et al. | 361/679.22 |
| 6,654,230 B1 * | 11/2003 | Jones et al. | 361/679.19 |
| 6,707,666 B1 * | 3/2004 | Chuang | 361/679.05 |
| 6,788,527 B2 * | 9/2004 | Doczy et al. | 361/679.11 |
| 6,862,171 B1 * | 3/2005 | Maskatia et al. | 361/679.06 |
| 6,882,524 B2 * | 4/2005 | Ulla et al. | 361/679.09 |
| 6,944,012 B2 | 9/2005 | Doczy et al. | |
| 6,952,343 B2 | 10/2005 | Sato | |
| 6,980,420 B2 * | 12/2005 | Maskatia et al. | 361/679.57 |
| 6,986,492 B2 * | 1/2006 | Huang et al. | 248/346.03 |
| 7,002,794 B2 | 2/2006 | Wang et al. | |
| 7,025,274 B2 * | 4/2006 | Solomon et al. | 235/472.01 |
| 7,035,094 B2 * | 4/2006 | Huang et al. | 361/679.55 |
| 7,042,712 B2 | 5/2006 | Ghosh et al. | |
| 7,052,296 B2 | 5/2006 | Yang et al. | |
| 7,068,496 B2 * | 6/2006 | Wong et al. | 361/679.28 |
| D524,312 S | 7/2006 | Young | |
| 7,088,340 B2 | 8/2006 | Kato | |
| 7,106,579 B2 * | 9/2006 | Maskatia et al. | 361/679.28 |
| 7,197,332 B2 | 3/2007 | Andersson et al. | |
| 7,206,196 B2 | 4/2007 | Ghosh et al. | |
| 7,236,354 B2 | 6/2007 | Hsu et al. | |
| 7,251,127 B2 | 7/2007 | Ghosh et al. | |
| 7,298,610 B2 * | 11/2007 | Kim et al. | 361/679.55 |
| 7,336,480 B2 | 2/2008 | Kwon | |
| 7,353,052 B2 | 4/2008 | Yamasaki | |
| 7,414,834 B2 | 8/2008 | Ukonaho et al. | |
| 7,426,406 B2 | 9/2008 | Maatta et al. | |
| 7,472,267 B2 | 12/2008 | Park et al. | |
| 7,653,872 B2 | 1/2010 | Yamashita | |
| 7,948,744 B2 | 5/2011 | Bishop et al. | |
| 8,208,245 B2 * | 6/2012 | Staats et al. | 361/679.02 |
| 8,284,543 B2 * | 10/2012 | Wang | 361/679.01 |
| 2001/0022719 A1 | 9/2001 | Armitage et al. | 361/681 |
| 2001/0034739 A1 | 10/2001 | Anecki et al. | |
| 2003/0088639 A1 | 5/2003 | Lentini et al. | |
| 2003/0104470 A1 | 6/2003 | Fors et al. | |
| 2004/0001099 A1 | 1/2004 | Raynar et al. | |
| 2004/0006737 A1 | 1/2004 | Colbath et al. | |
| 2004/0007649 A1 | 1/2004 | Vettraino | |
| 2004/0153649 A1 | 8/2004 | Rhoads et al. | |
| 2004/0189484 A1 | 9/2004 | Li | |
| 2004/0212954 A1 | 10/2004 | Ulla et al. | |
| 2004/0246668 A1 * | 12/2004 | Maskatia et al. | 361/683 |
| 2005/0032026 A1 | 2/2005 | Donahue | |
| 2005/0057894 A1 * | 3/2005 | Kim et al. | 361/683 |
| 2005/0108636 A1 | 5/2005 | Sylthe et al. | |
| 2005/0111182 A1 * | 5/2005 | Lin et al. | 361/686 |
| 2005/0128695 A1 | 6/2005 | Han | |
| 2005/0168925 A1 * | 8/2005 | Fang et al. | 361/683 |
| 2006/0010377 A1 | 1/2006 | Anecki et al. | |
| 2006/0034045 A1 | 2/2006 | Wang | |
| 2006/0061806 A1 | 3/2006 | King et al. | |
| 2006/0084038 A1 | 4/2006 | Stillman | |
| 2006/0104020 A1 | 5/2006 | Fan et al. | |
| 2006/0221565 A1 * | 10/2006 | Doherty et al. | 361/683 |
| 2006/0253449 A1 | 11/2006 | Williamson et al. | |
| 2006/0256511 A1 * | 11/2006 | Ma | 361/680 |
| 2006/0282819 A1 | 12/2006 | Graham et al. | |
| 2007/0011140 A1 | 1/2007 | King et al. | |
| 2007/0011190 A1 | 1/2007 | Finney | |
| 2007/0033280 A1 | 2/2007 | Popp et al. | |
| 2007/0033531 A1 | 2/2007 | Marsh | |
| 2007/0300143 A1 | 12/2007 | Vanderport | |
| 2009/0244009 A1 | 10/2009 | Staats et al. | |
| 2009/0323266 A1 * | 12/2009 | Mizuno | 361/679.02 |
| 2011/0222238 A1 * | 9/2011 | Staats et al. | 361/679.55 |

OTHER PUBLICATIONS

Blickenstorfer, Conrad H. "Tablet PCs: HP Compaq Tablet PC TC1000" Pen Computing Magazine, Dec. 2002, http://www.pencomputing.com/frames/tpc_compaq.html, 3 pages.

Brava! by Informative Graphics, "Brave! Features & Benefits"; http://www.bravaviewer.com/;featurebenefits.htm; Sep. 16, 2007, 5 pages.

Rubin, Ross "Switched On: Connecting Mobile, Mantle and Metal Objects (Part 1)" http://www.engadget.com/2009/03/05switched-on-connecting-mobile-mantle-and-metal-objects-part1/; Mar. 5, 2009, 3 pages.

TGL Media, Inc., "THe Facts About Hyperlinked Briefs", http://www.tglmedia.com/Pages/thefactsabout.html, 3 pages.

Baran, Daya "Lenovo Ideapad Will Win Where Microsoft Failed," Jan. 11, 2010, http://www.webguild.org/20100111/lenovo-ideapad-will-win-where-microsoft-failed, 5 pages.

Miller, Paul, "Touch Book from Always Innovating Harbors Removable Tablet, Netbook Pricepoint," posted Mar. 2, 2009, http://www.engadget.com/2009/03/02/touch-book-from-always-innovating-harbors-removable-tablet-netb/, 3 pages.

* cited by examiner

TABLET COMPUTER

CROSS-REFERENCE TO RELATED APPLICATIONS

This application claims benefit of priority to U.S. non-Provisional patent application Ser. No. 12/415,944, filed on Mar. 31, 2009 and entitled "Tablet Computer," which claims benefit of priority to U.S. Provisional Patent Application No. 61/041,093, entitled "Tablet Computer with Counterbalance and Detachable Keyboard" and filed on Mar. 31, 2008. Each of the '944 patent application and the '093 patent application are incorporated by reference herein in its entirety.

BACKGROUND

Tablet computers have many advantages not found in standard desktop or notebook computers. Chief among these advantages is usually the ability to interface with the tablet computer by writing on or tapping a touch screen display using a stylus or other implement. Input to the computer may thus be entered in a manner similar to writing on paper rather than using a keyboard. This model provides great efficiency in note-taking environments or when used in a highly mobile environment where it is difficult to set up or use a keyboard and mouse to input data into the computer. Unfortunately, this advantage is also a great disadvantage because, while many users may appreciate the flexibility of input through writing, there is usually still a great need and efficiency in using a keyboard for data entry, for example, when writing a document such as this. For this and other reasons, adoption of tablet computers has been limited and is primarily used in specialized industries with highly mobile users, for example, package delivery services that use "slate" computers or personal digital assistants (PDAs).

There are some laptop or notebook computers that emulate the function of a tablet computer. These notebook computers are equipped with a touch screen liquid crystal display (LCD) that opens, rotates and closes again on top of the keyboard with the touch screen LCD facing outward for use as a tablet. In these notebook configurations, the substantial hardware of the computer including the processor, memory, and battery is housed in the keyboard section of the notebook computer. While the touch screen LCD is hinged and rotatably attached to the keyboard section, it remains permanently affixed to the keyboard section.

The information included in this Background section of the specification, including any references cited herein and any description or discussion thereof, is included for technical reference purposes only and is not to be regarded subject matter by which the scope of the invention is to be bound.

SUMMARY

A novel implementation of a tablet computer is composed of a tablet component and a keyboard component. The tablet component houses all of the essential hardware of tablet computer including the central processing unit (CPU), the memory, the power supply (battery and DC transformer), the system bus, network and peripheral interface cards and ports, a loudspeaker, and a touch screen display. The keyboard component is a simple peripheral device that offers no computing functionality unless connected with the tablet component or another computer. In one configuration, the tablet component and keyboard component mate to form a notebook-type computer. In a second configuration, the tablet component and keyboard component mate in an orientation allowing use of only a tablet computing user interface. In a third configuration, the tablet component is removable from the keyboard component and functions independent of the keyboard component as a tablet computing device.

The tablet component may be in a hinged relationship with the keyboard component when the tablet component is attached to the keyboard component. The keyboard component is further configured with a counterbalance armature to oppose the moment of inertia due to the changing center of mass of the tablet computer as the tablet component is moved from a closed to an open position, thus preventing the tablet computer from falling over when the bottom of the keyboard component is resting on a flat surface. In one implementation, the counterbalance armature may function as a handle for carrying the tablet computer when in an extended position. In another implementation, the counterbalance armature may be partially housed within the keyboard when in a retracted position. In a further implementation, the counterbalance armature may interface with a tension hinge on the keyboard component to prevent a user from rotating the tablet component to an open position unless the counterbalance armature is extended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION

Figure 1:
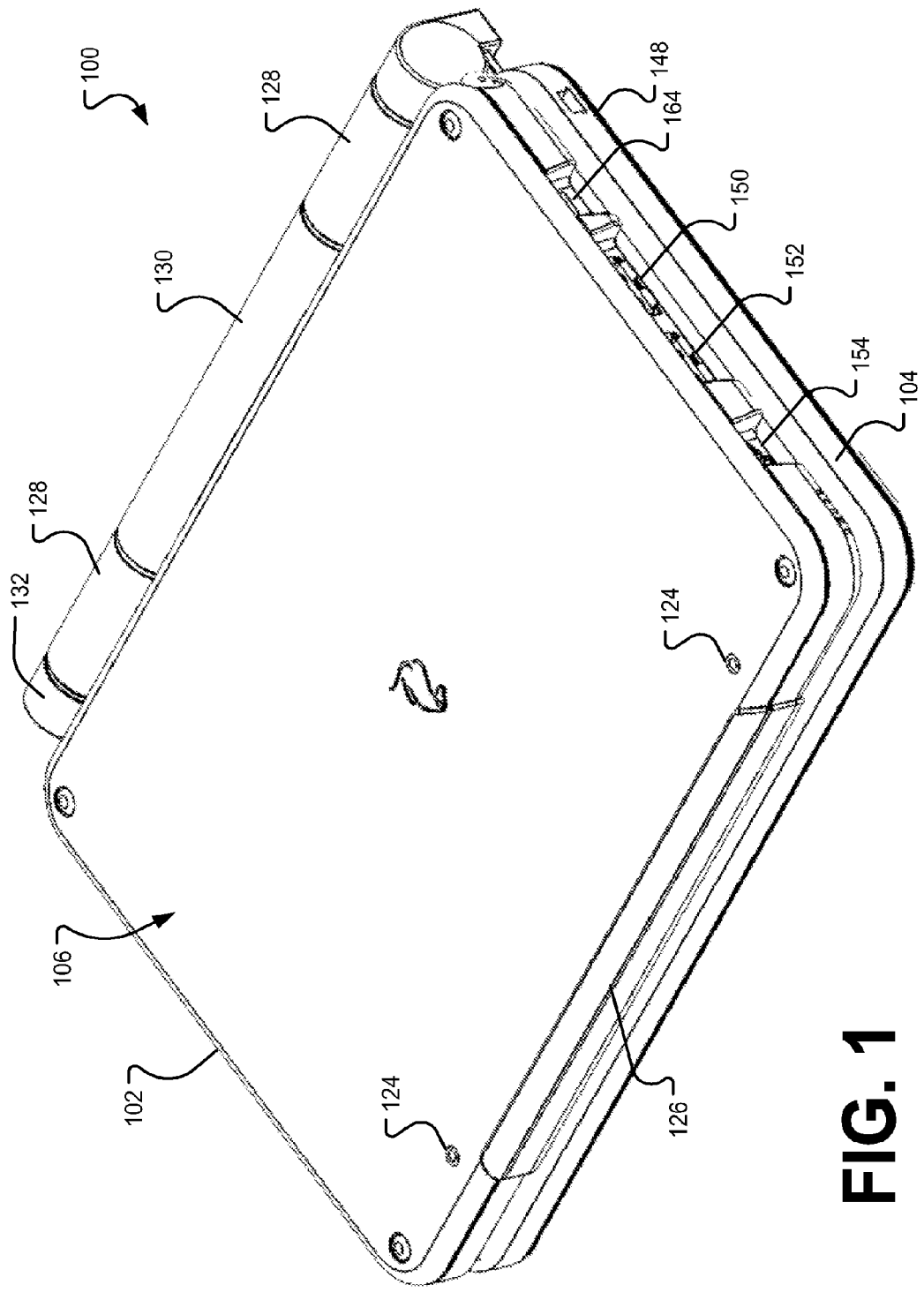
FIG. 1 is an isometric view of an implementation of a tablet computer connected with the key board in a closed position and further with a counterbalance armature in a closed position.

The figures depict a new implementation of a tablet computer 100. As shown in FIG. 1, the tablet computer 100 is primarily composed of two components, a tablet component 102 and a keyboard component 104. In contrast to known notebook or laptop computers, the hardware components providing the computing functionality of the tablet computer 100 are packaged within the tablet component 102 while keyboard component 104 functions merely as a peripheral device. This means that the tablet component 102 houses the microprocessor, memory, power supply, graphics card, network card, wireless card, battery, DC transformer, serial bus, touch screen liquid crystal display (LCD), and other standard hardware components that, with the exception of an LCD screen, are packaged under the keyboard in a traditional notebook or laptop computer. In one implementation, the memory may be in the form of a high-capacity flash drive, thus creating an entirely solid state tablet computer 100 with no moving parts.

FIG. 1 depicts the tablet computer 100 in a closed position with the tablet component 102 lying against the keyboard component 104. In the configuration of FIG. 1, the back 106 of the tablet component 102 is exposed. In contrast, in FIG. 2 a face 108 of the tablet component 102 is configured as the exterior surface thereby exposing a touch screen LCD 110. Actual implementations of these various configurations of the tablet computer 100 will be described further herein below.

Figure 2:
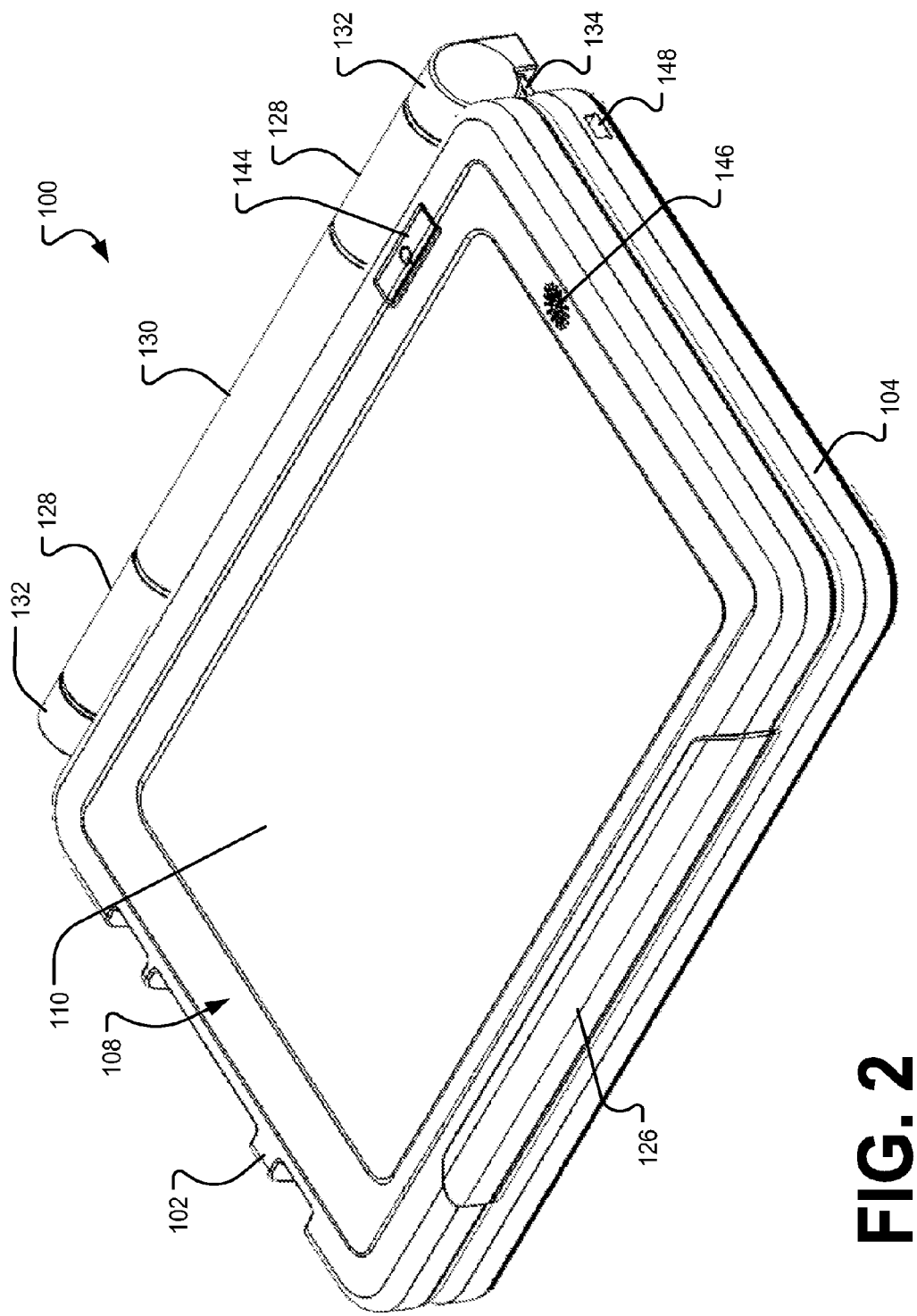
FIG. 2 is an isometric view of the tablet computer of FIG. 1 in an alternate configuration with a touch sensitive LED screen in an exposed position.

As shown in FIG. 1, the tablet component 102 of the tablet computer 100 may provide a number of network or peripheral interface ports, for example, a first universal serial bus (USB) port 150, a second USB port 152, and an Ethernet port 154. In addition, the tablet component 102 may provide a receptacle 164 for connecting to an external power source. The receptacle may be configured to receive pins from a power supply cable or may provide a magnetic connection for quick release power supply cables. The tablet component 102 may also define a compartment or slot for storage of a stylus 166 for use in interfacing with the touch screen LCD 110. A power switch 144 may be provided on the face 108 of the tablet component 102 as depicted in FIG. 2. In addition the face 108 of the tablet component 102 may further define a perforated area 146 beneath which a loudspeaker may be mounted, thereby directing sound generated by the loudspeaker toward a user of the tablet computer 100.

The keyboard component 104 may additionally be configured with a USB port 148 as shown in FIGS. 1 and 2. In one implementation, the keyboard component 104 may be connected with the tablet component 102 via a cable between either the first USB port 150 or the second USB port 152 and the keyboard USB port 148. An alternate communication connection between the keyboard component 104 and the tablet component 102 is described further herein below. It may be appreciated that while the keyboard component 104 in the implementation depicted in the figures is designed to interface particularly with the tablet component, it may be connected to any other computer via the USB port 148 for use as a peripheral keyboard.

Figure 4:
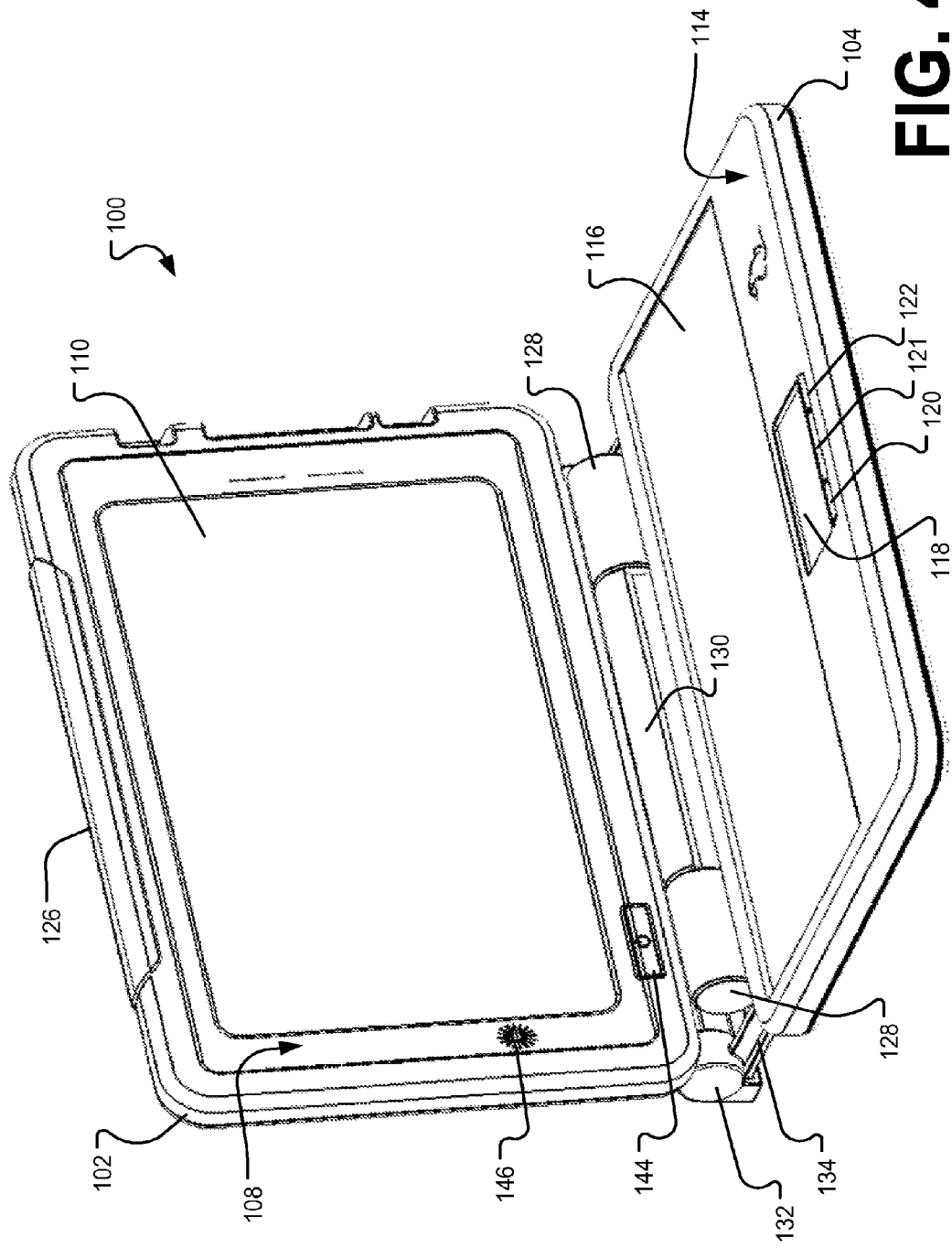
FIG. 4 is an isometric view of the tablet computer of FIG. 1 in an open position with the tablet component connected to the keyboard component.

When the tablet computer 100 is in an open configuration as shown is FIG. 4, the top surface 114 of the keyboard component 104 is exposed. The top surface 114 of the keyboard component 104 may include a keyboard 116 and a touchpad 118 or track pad for manipulation of a cursor or other onscreen elements on the touch screen LCD 110. The keyboard 116 may be configured as a standard button keyboard or as a flat membrane keypad to reduce the profile of the keyboard component 104 and provide a higher level of environmental resistance when used in harsh operating environments. The touchpad 118 may additionally include a left-click button 120 and a right-click button 122 as with standard mouse controls for selection of objects and features within a user interface. The touch pad may further include a center-click button 121 for additional functionality.

Figure 3:
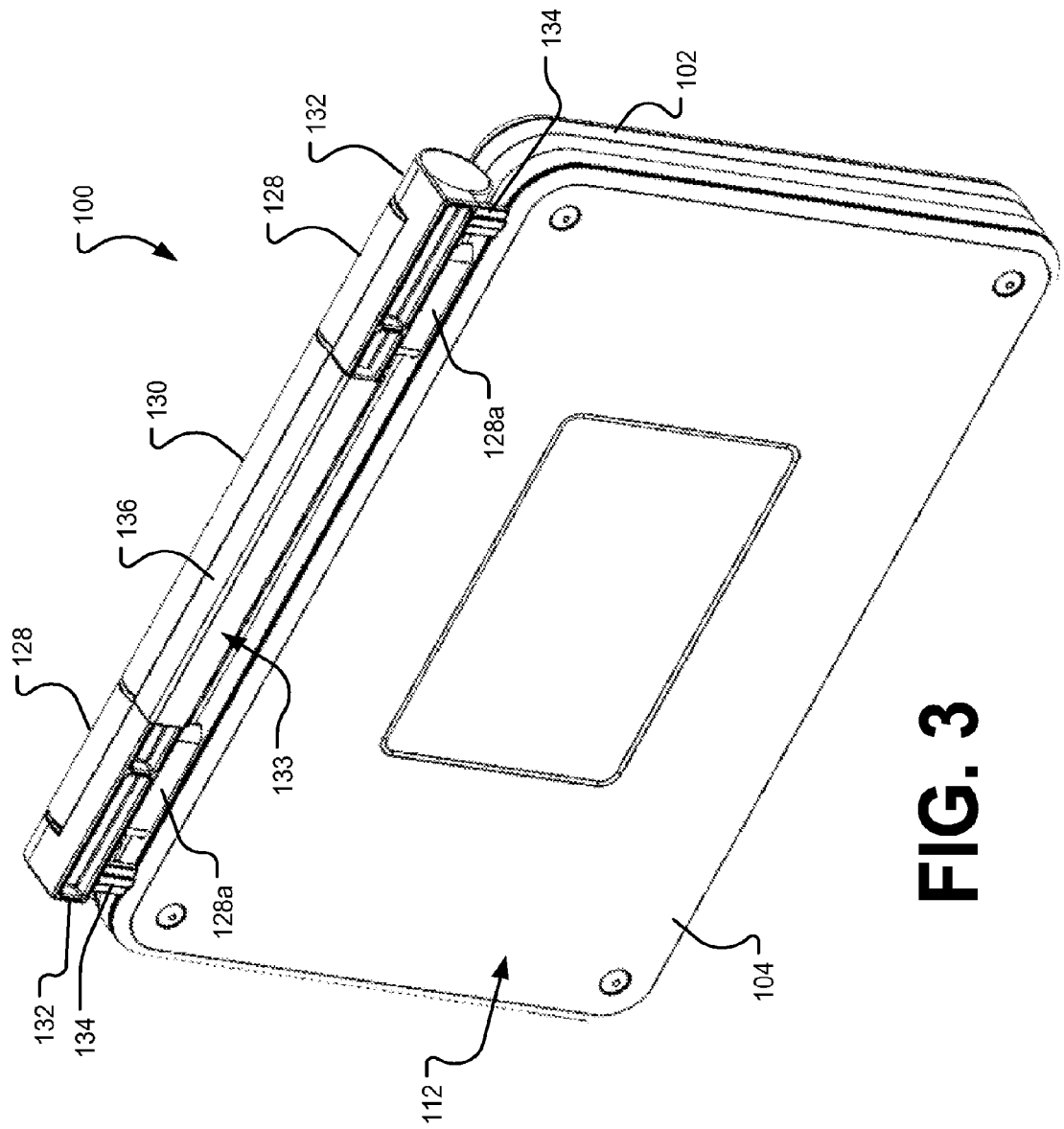
FIG. 3 is an isometric view of the bottom of the tablet computer of FIG. 1 particularly showing a bottom of the keyboard component.

As shown in FIGS. 1-4, the tablet component 102 of the tablet computer 100 may be mounted to the keyboard component 104 in a hinged configuration. In one exemplary implementation as shown in the figures, two stationary tension hinges 128 may be fixed to the keyboard component 104 via mounting members 128a as shown in FIG. 3. A rotating tension hinge 130 is mounted in between the stationary tension hinges 128. The tablet component 102 is removably mounted to the rotating tension hinge 130 in a manner further described below.

When the tablet computer 100 is in an open configuration and the tablet component 102 is connected with the keyboard component 104 as shown in FIG. 4, it may be appreciated that the tablet computer 100 is comparable to a normal laptop computer. However, the tablet computer 100 is relatively top-heavy because all of the hardware components are packaged within the tablet component 102. Thus, as the tablet component 102 rotates to an open position, the center of mass of the tablet computer 100 will shift to a point behind the keyboard component 104 and the moment of inertia will cause the tablet computer 100 to tip and fall onto the back 106 of the tablet component 102 instead of resting on the bottom 112 of the keyboard component 104. This result is in contrast to a normal notebook computer in which the majority of the mass of the computer resides in the keyboard portion and thus allows the LCD screen portion to cantilever backwards without tipping the notebook computer.

Figure 9:
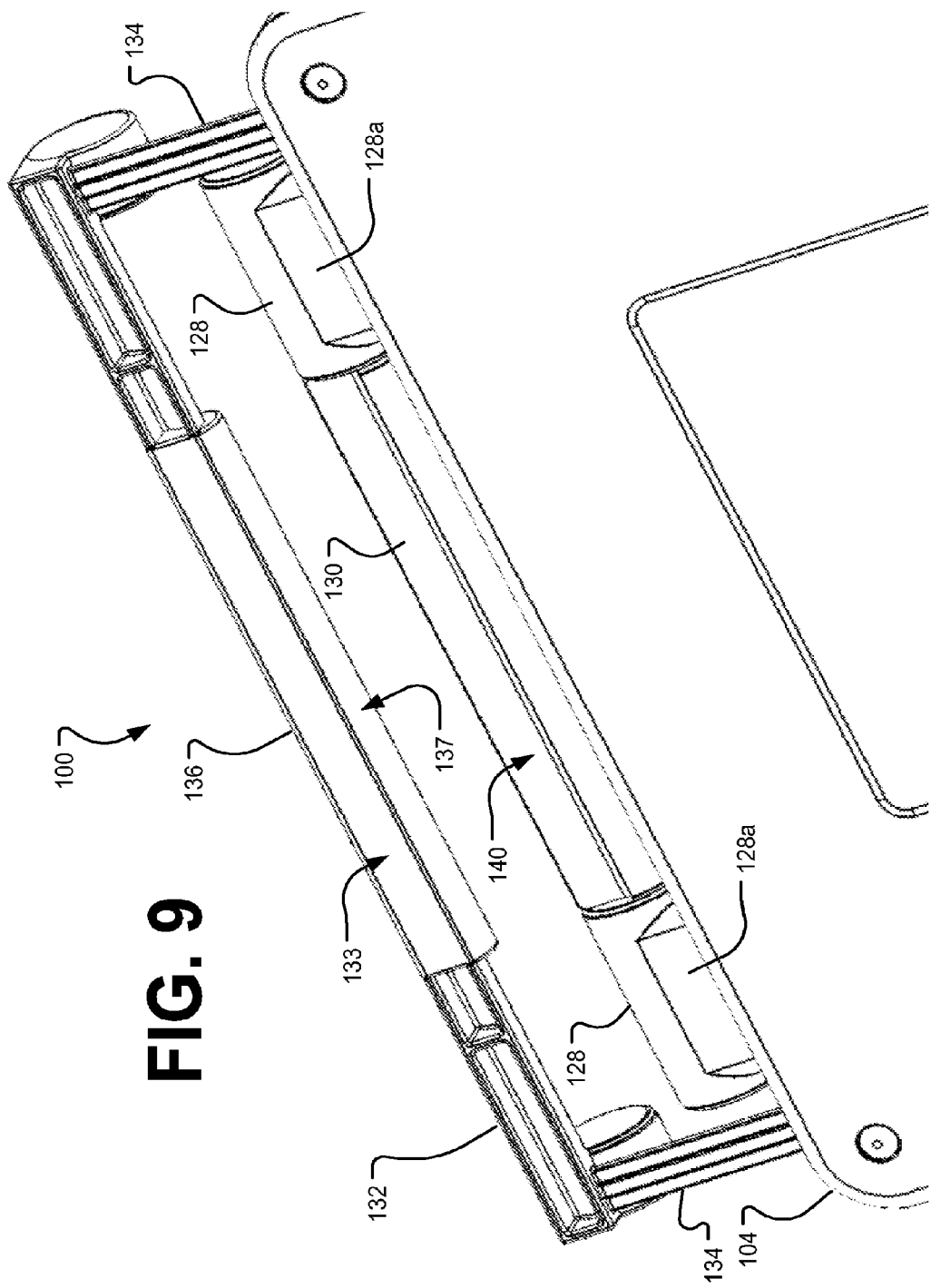
FIG. 9 is a bottom isometric view of the tablet computer of FIG. 1 depicting the counterbalance armature in an extended position.

In order to remedy this situation, the keyboard component 104 is designed to house an extending counterbalance armature 132, which, when in an extended configuration as shown in FIG. 4, acts to oppose the moment of inertia and maintain the tablet computer 100 in an upright position. In the implementation shown in the figures, the counterbalance armature 132 may be designed to mate with and assume the same form factor, as the tension hinges 128, 130 in a refracted position as shown in FIGS. 1-3, and extend on rails 134 to a position behind the tension hinges 128, 130 in an extended configuration. The counterbalance armature 132 extends across the back of the keyboard component 104 between the rails 134. As shown in FIGS. 3 and 9, a bottom face 133 of the counterbalance armature 132 is flat and lies in the same plane as the bottom 112 of the keyboard component 104 to allow the tablet computer 100 to lie flat against a plane, e.g., a work surface such as a table or desk.

In another implementation, the tablet computer 100 includes a mechanism that automatically extends the counterbalance armature 132 as the tablet component 102 is opened with respect to the keyboard component 104. For example, in one configuration, one or more gear-like elements (not shown) are formed in the hub of the rotating tension hinge 130, mating with an intermediate gear (not shown) that engages with a toothed surface (not shown) of one or more of the rails 134. In this manner, as the tablet component 102 is raised with respect to the keyboard component 104, the connector 156 rotates the rotating tension hinge 130, which rotates the intermediate gear in the opposite direction against the toothed surface of the rail 134 to force the rail 134 to move, thereby extending the counterbalance armature 132. The automatic extension of the counterbalance armature 132 may be disabled using a release (not shown). For example, the release can decouple the gear-like element from the intermediate gear, so as to allow the connector 156 to open (and the rotating tension hinge 130 to rotate) without rotating the intermediate gear.

In other implementations, a spring-loaded rotating tension hinge system assists with the auto-extension of the counterbalance armature 132, which could be invoked by way of a cog and toothed track or by pneumatics, which are compressed when the tablet component 102 is shut and then auto-decompressed when the tablet component 102 is opened again. In yet other implementations, a set of cables and pulleys may be employed to automatically extend the counterbalance armature 132.

Figure 7:
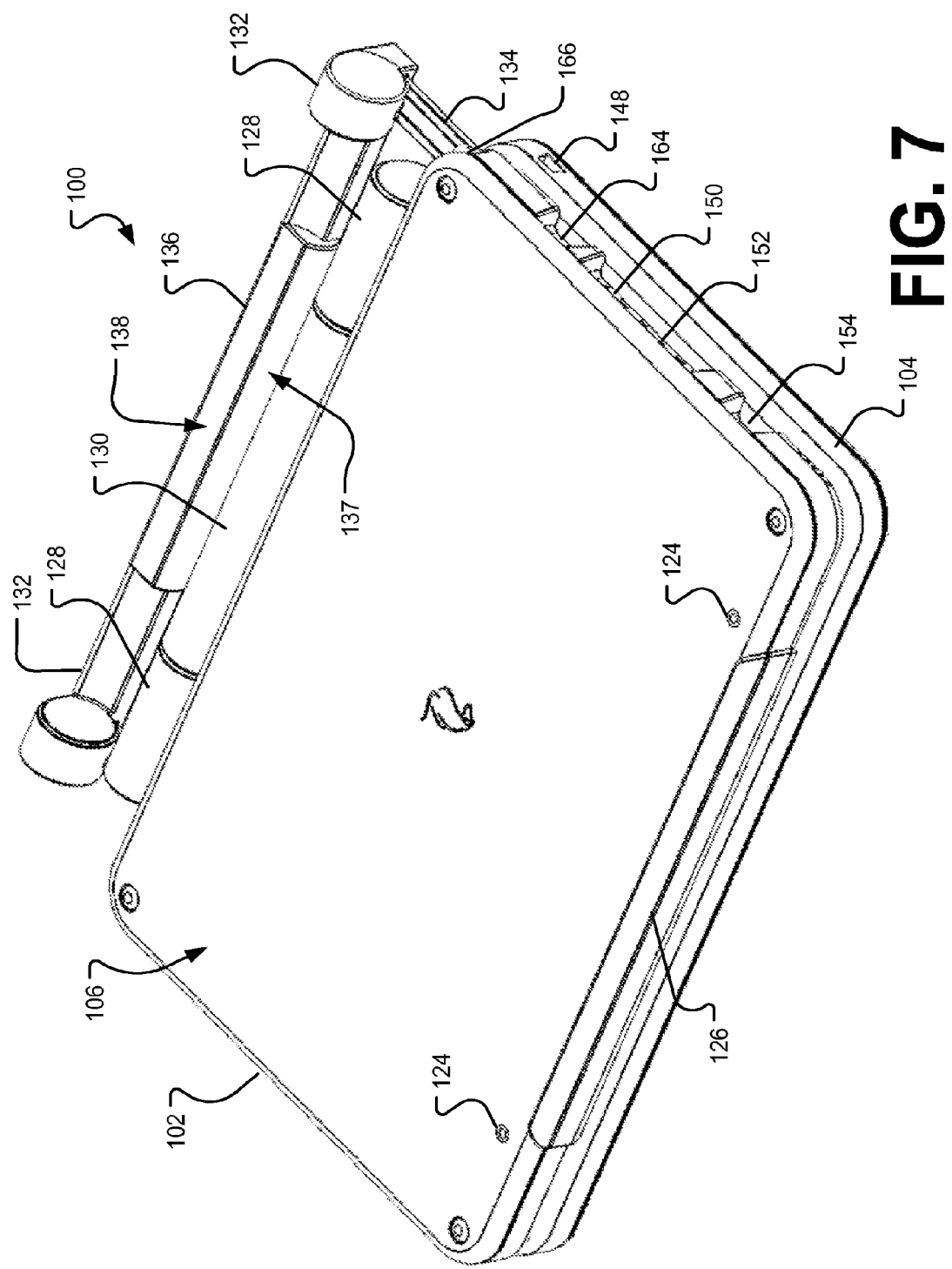
FIG. 7 is an isometric view of the tablet computer of FIG. 1 with a counterbalance armature in an extended position.

It should be appreciated that when the tablet computer 100 is in a closed configuration such as FIG. 7, the counterbalance armature 132 may be extended to act as a handle for carrying the tablet computer. A handle portion 136 may be formed in a middle section of the counterbalance armature 132 coextensive with the width of the rotating tension hinge 130. The handle portion 136 of the counterbalance armature 132 may also define a curved or rounded surface 137 that faces the back or rear of the keyboard component 104. Such a rounded surface 137 on the handle portion 136 may be desirable for ease and comfort in gripping the handle 136 in a user's hand.

Figure 8:
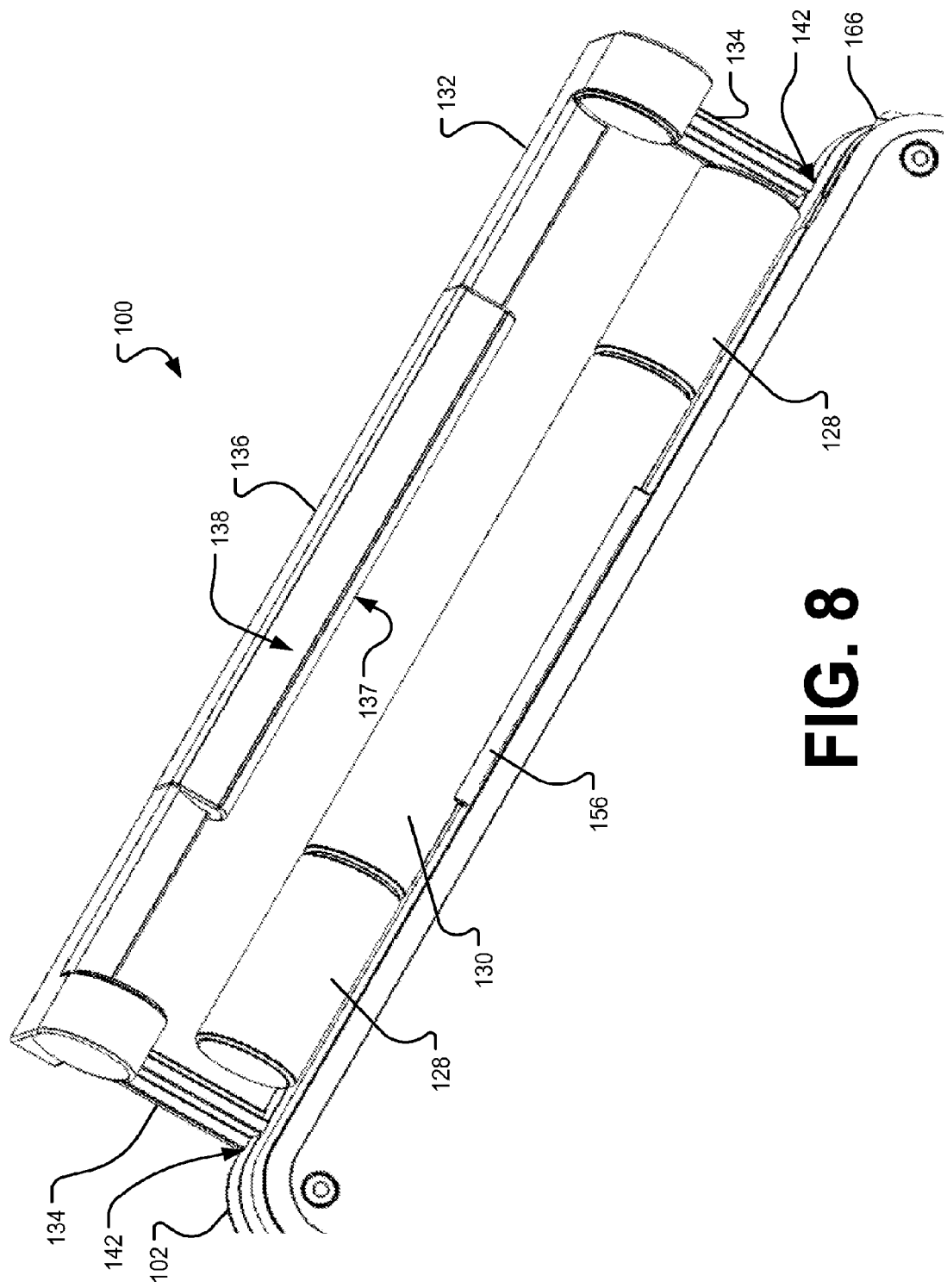
FIG. 8 is an isometric top view of a portion of the tablet computer of FIG. 1 depicting the counterbalance armature in an extended position.

As depicted in FIGS. 7 and 8, the handle portion 136 of the counterbalance armature 132 may also define a flat face 138 on the top side of the counterbalance armature 132. As shown in FIG. 9, a handle recess 140 may be defined within the bottom of the rotating tension hinge 130. The handle recess 140 may have a flat surface opposing the flat face 138 of the handle 136 when the counterbalance armature 132 is in a retracted configuration. It may thus be appreciated that when the tablet computer 100 is in a closed configuration as depicted in either FIG. 1 or FIG. 2 and the counterbalance armature is in a contracted configuration mating with the tension hinges 128, 130, a user will be unable to open tablet computer 102 from its position against the keyboard component 104. This is so because the interface between the flat face 138 of the handle 136 and the handle recess 140 in the rotating tension hinge 130 prevents the rotating tension hinge 130 from rotating with respect to the stationary tension hinges 128. This configuration therefore allows a user to extend the counterbalance armature 132 before opening the tablet component 102 with respect to the keyboard component 104, thereby ensuring that the tablet computer 100 does not tip over when placed in an open configuration.

Figure 5:
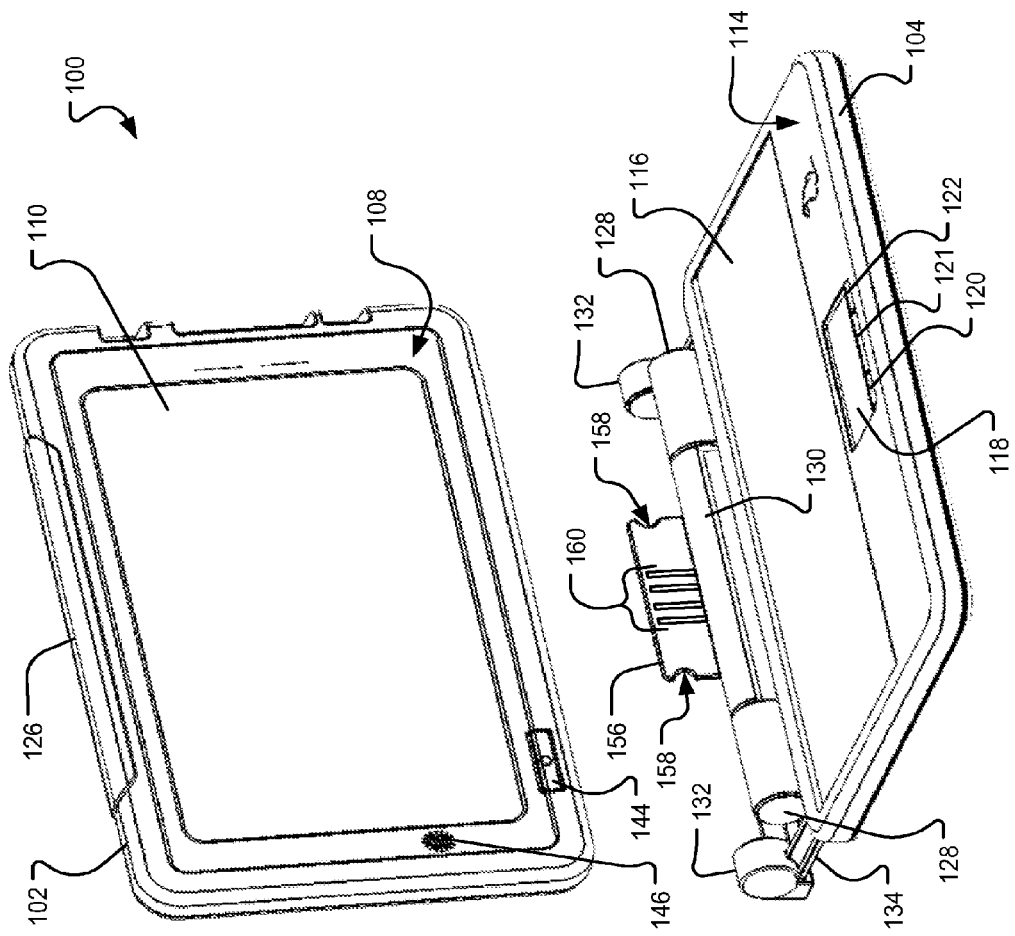
FIG. 5 is an isometric view of the tablet computer of FIG. 1 depicting the tablet component separated from the keyboard component.
Figure 6:
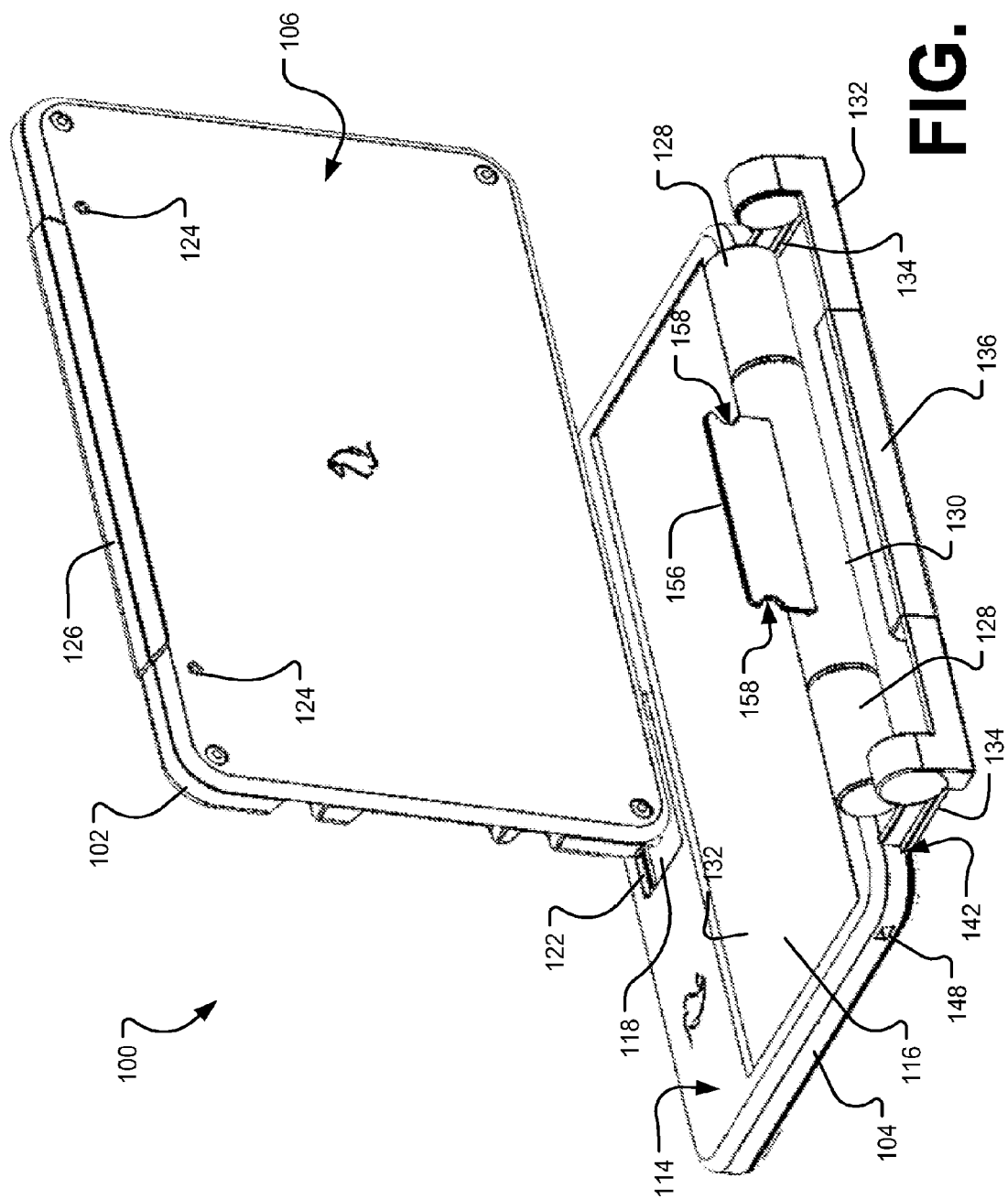
FIG. 6 is a rear isometric view of the tablet computer of FIG. 1 depicting the tablet component separated from the keyboard component.

FIGS. 5 and 6 show the tablet computer 100 in a configuration in which the tablet component 102 is separated from the keyboard component 104. Recall that all the hardware for the tablet computer 100 is housed within the tablet component 102. Therefore, the tablet component 102 may be removed from the keyboard component 104 and used independently as a true tablet computing device with user interface control implemented through the touch screen LCD 110, for example, by using the stylus 166 or other similar implement. The tablet component 102 may be fabricated with an overmold grip 126 for ease of grasping and holding the tablet component 102 by a user when in a separated configuration. The overmold grip 126 may be a plastic, rubber, or an elastomer coating over a portion of the housing of the tablet component 102.

As shown in FIGS. 5, 6, 12, and 13, the tablet component 102 may connect with the keyboard component 104 via an interface tab 156 extending from the rotating tension hinge 130. The interface tab 156 fits in a tab slot 162 within the bottom edge of the tablet component 102. The interface tab 156 may have recessed engagement keys 158 on each lateral side that interfaces with an engagement structure within the tab slot 162. Such an engagement structure may be in the form of a rubber gasket, a ball-plunger, or other friction fitting mechanisms mounted on lateral ends within the tab slot 162 in order to removably, but frictionally, engage the interface tab 156 within the tab slot 162. The friction fit between the interface tab 156 and the tab slot 162 should be sufficient to support the weight of the tablet component 102 in the event the tablet computer 100 is turned upside down when the tablet component 102 is attached to the keyboard component 104. However, the force of the friction fit should be such that the interface tab 156 is released from within the tab slot 162 upon the exertion of a moderate amount of pulling force by a user to separate the tablet component 102 from the keyboard component 104.

The interface tab 156 may further be provided with contact traces 160 that connect with corresponding receptacle traces or pins (not shown) within the tab slot 162 in order to communicate user input via the keyboard 116 or touch pad 118 when the tablet component 102 is connected with the keyboard component 104. While the contact traces 160 are shown only on one side of the interface tab 156 in the figures, contact traces may be provided on the other side or both sides of the interface tab 156. Alternatively, the receptacles within the tab slot 162 of the tablet component 102 may be positioned on both sides of the tab slot 162 such that input via the keyboard 116 or touch pad 118 is available regardless of the orientation of the tablet component 102.

Figure 10:
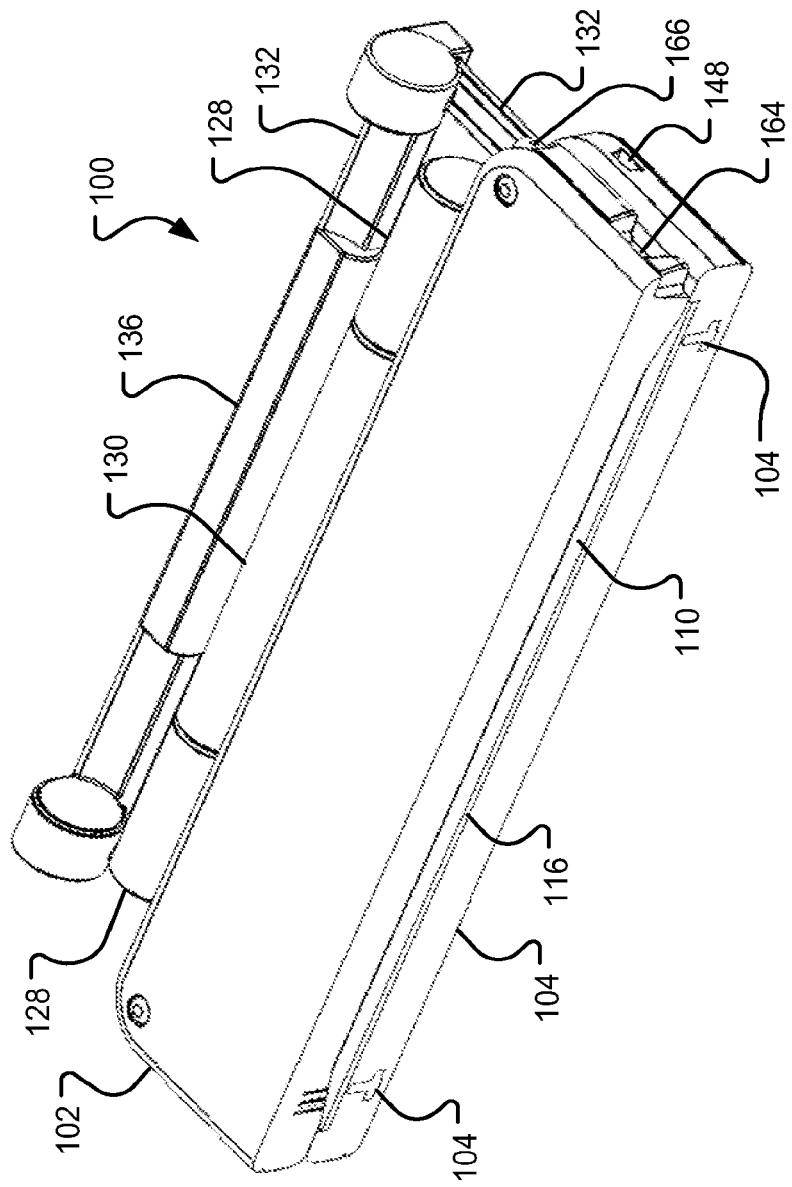
FIG. 10 is an isometric view in cross-section of the tablet computer of FIG. 1 detailing T-shaped slots for storage of rails of the counterbalance armature that is depicted in an extended position.
Figure 11:
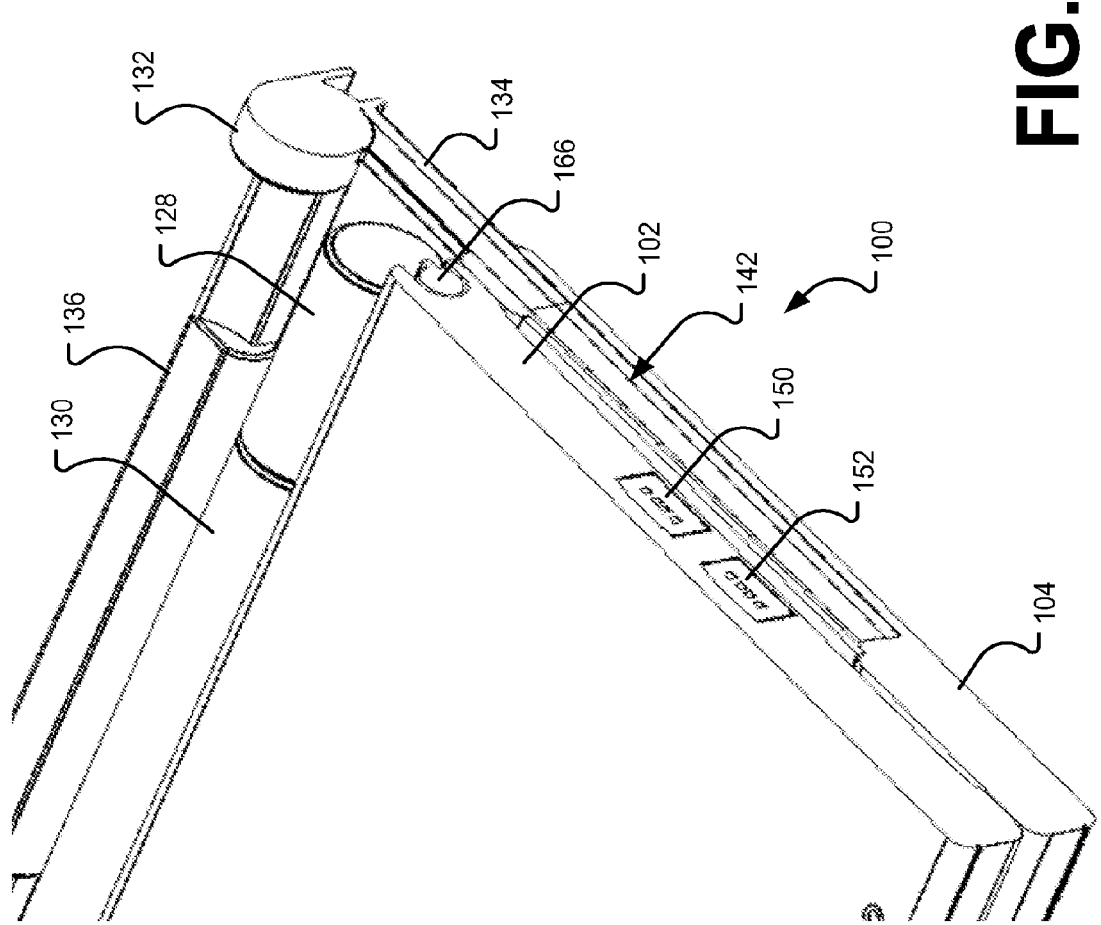
FIG. 11 is an isometric view in cross-section of the tablet computer of FIG. 1 detailing a storage slot for a rail of the counterbalance armature that is depicted in an extended position.

As shown in FIGS. 8, 10, and 11, the rails 134 extending from the counterbalance armature 132 are housed within rail slots 142 in the keyboard component 104. It may be appreciated that since the keyboard component 104 does not house any of the hardware of the tablet computer 100, there is adequate space available within the keyboard component 104 for housing the rails for the counterbalance armature 132. As shown in the figures, the counterbalance armature may be in the shape of a T in order to provide lateral, vertical, and torsional stability to the counterbalance armature 132 as well as tensile strength to the rails 134 when in an extended position. The rail sockets 142 may similarly be T-shaped to conform to the shape of the rails 134. The rail sockets 142 may be configured with retention hardware similar to hardware used in drawer rails in order to prevent the rails 134 of the counterbalance armature 132 from pulling completely out of the rail sockets 142. This allows the counterbalance armature 132 to be used as a handle as previously described. The rail sockets 142 may further be configured with a friction fit or other mechanism that engages the rails 134 when the counterbalance armature 132 is in a contracted or closed position in order to prevent the counterbalance armature 132 from accidentally sliding out and extending in the absence of some positive pulling force initiated by a user.

As shown in FIGS. 1 and 6, the back 106 of the tablet component 102 may be configured with one or more mounting holes 124 to allow the tablet component 102 or the entire tablet computer 100 to be mounted to a surface, for example, a wall. The mounting holes 124 may be simple threaded apertures, for example, a standard quarter-20 threads into which screws may be fixed. Alternatively, the mounting holes 124 could be configured as bayonet fittings, use ball plungers, or provide any other retention mechanism. A variety of mounting hardware and frames may thereby be affixed to the back 106 of the tablet component 102 to assist in mounting the tablet computer 100 in a variety of configurations, for example, to a flat surface, on an articulated or hinged arm, or otherwise.

Figure 12:
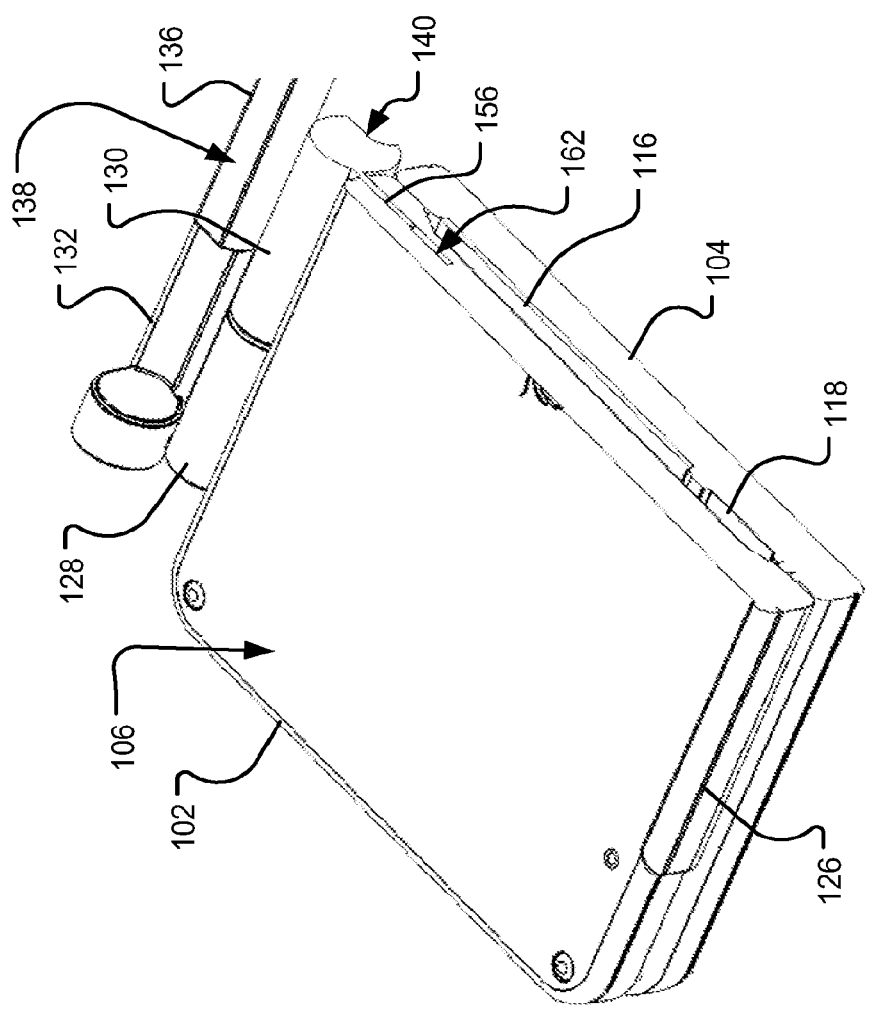
FIG. 12 is an isometric view in cross-section of the tablet computer of FIG. 1 detailing the connection between the tablet component and the keyboard component by an interface tab.
Figure 13:
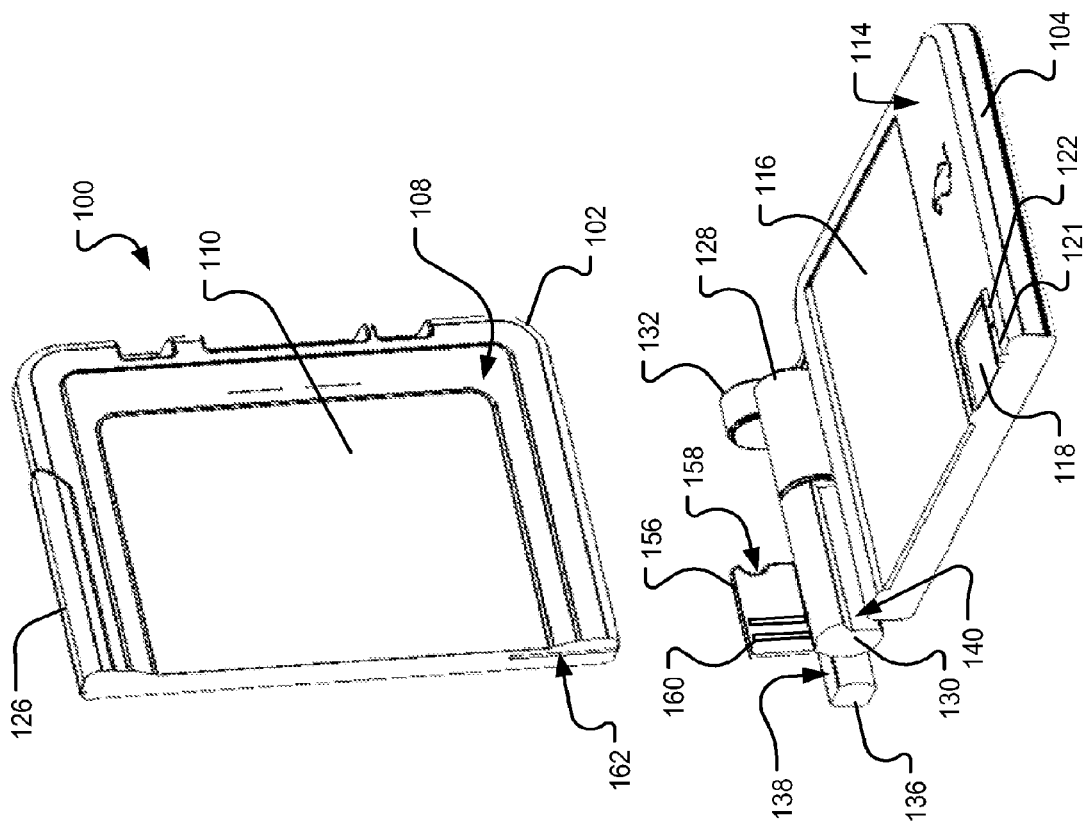
FIG. 13 is an isometric view cross-section of the tablet computer of FIG. 1 depicting the tablet component separated from the keyboard component in particular the interface tab on the keyboard component and the corresponding tab slot on the tablet component used to join the tablet component and the keyboard component together.
Figure 14:
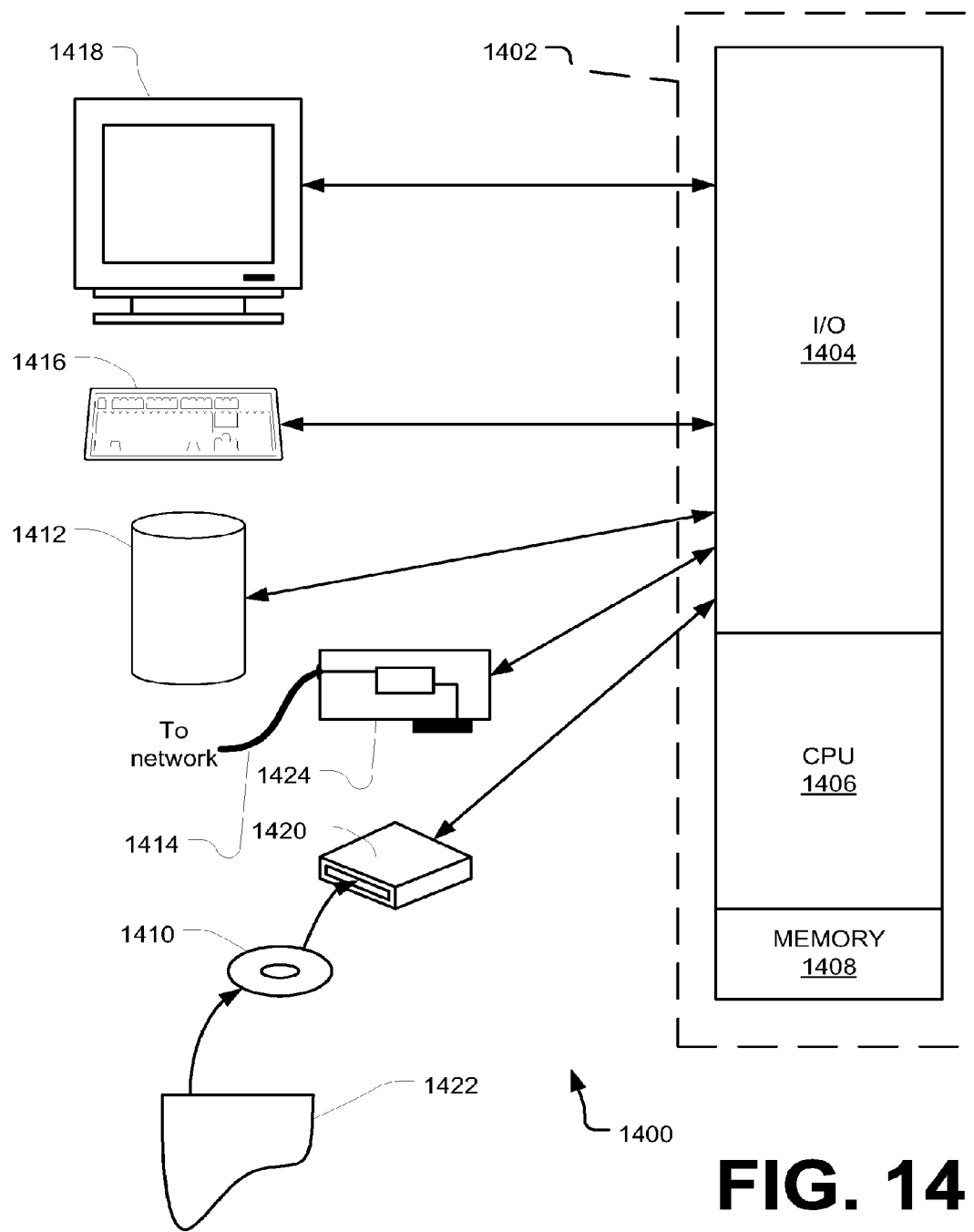
FIG. 14 illustrates an example system that may be useful in implementing the described technology.

FIG. 12 illustrates an example system that may be useful in implementing the described technology. A general purpose computer system 1200 is capable of executing a computer program product to execute a computer process. Data and program files may be input to the computer system 1200, which reads the files and executes the programs therein. Some of the elements of a general purpose computer system 1200 are shown in FIG. 12 wherein a processor 1202 is shown having an input/output (I/O) section 1204, a Central Processing Unit (CPU) 1206, and a memory section 1208. There may be one or more processors 1202, such that the processor 1202 of the computer system 1200 comprises a single central-processing unit 1206, or a plurality of processing units, commonly referred to as a parallel processing environment. The computer system 1200 may be a conventional computer, a distributed computer, or any other type of computer. The described technology is optionally implemented in software devices loaded in memory 1208, stored on a configured DVD/CD-ROM 1210 or storage unit 1212, and/or communicated via a wired or wireless network link 1214 on a carrier signal, thereby transforming the computer system 1200 in FIG. 12 to a special purpose machine for implementing the described operations.

The I/O section 1204 is connected to one or more user-interface devices (e.g., a keyboard 1216 and a display unit 1218), a disk storage unit 1212, and a disk drive unit 1220. Generally, in contemporary systems, the disk drive unit 1220 is a DVD/CD-ROM drive unit capable of reading the DVD/CD-ROM medium 1210, which typically contains programs and data 1222. Computer program products containing mechanisms to effectuate the systems and methods in accordance with the described technology may reside in the memory section 1204, on a disk storage unit 1212, or on the DVD/CD-ROM medium 1210 of such a system 1200. Alternatively, a disk drive unit 1220 may be replaced or supplemented by a floppy drive unit, a tape drive unit, a flash memory USB drive, or other storage medium drive unit. The network adapter 1224 is capable of connecting the computer system to a network via the network link 1214, through which the computer system can receive instructions and data embodied in a carrier wave. Examples of such systems include Power-PC and Intel-based computing systems offered by Apple Corp., personal computers offered by Dell Corporation and by other manufacturers of Intel-compatible personal computers, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 1200 is connected (by wired connection or wirelessly) to a local network through the network interface or adapter 1224, which is one type of communications device. When used in a WAN-networking environment, the computer system 1200 typically includes a modem, a network adapter, or any other type of communications device for establishing communications over the wide area network. In a networked environment, program modules depicted relative to the computer system 1200 or portions thereof, may be stored in a remote memory storage device. It is appreciated that the network connections shown are exemplary and other means of and communications devices for establishing a communications link between the computers may be used.

In an exemplary implementation, modules for managing attachment, detachment and operation of the keyboard and other modules may be incorporated as part of the operating system, application programs, other program modules, or circuit components. Data pertaining to the management of the detachable keyboard and other data may be stored as program data.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A device comprising:
   a tablet component;
   a keyboard component removably connected with the tablet component, wherein the keyboard component further comprising a rotating tension hinge having a first surface; and
   a counterbalance armature attached to the keyboard component that extends from the keyboard component, wherein the counterbalance armature defines a second surface and when the counterbalance armature is at least partially housed within the keyboard component in a retracted position, the first surface interfaces with the second surface and prevents the tablet component from being manipulated from a closed position to the open position.

2. The device of claim 1, wherein the counterbalance armature extends from the keyboard component to oppose a moment of inertia of the device when the tablet component is connected with and in an open position with respect to the keyboard component.

3. The device of claim 2, wherein the counterbalance armature further comprises two or more rails that are respectively received and housed within two or more slots in a housing of the keyboard component.

4. The device of claim 3, wherein the keyboard component further comprises an engagement structure in each of the two or more slots that engage the rails.

5. The device of claim 3, wherein a cross-section of each of the rails is T-shaped.

6. The device of claim 1, wherein the tablet component further comprises a touch screen display on a front face and the front face is positioned adjacent to and opposite a top face of the keyboard component when the device is in a closed position.

7. The device of claim 1, wherein the tablet component further comprises a back face and a display and interface screen on a front face and the back face is positioned adjacent to and opposite a top face of the keyboard component while the front face remains exposed when the device is in a closed position.

8. The device of claim 1, wherein the counterbalance armature functions as a handle for the device.

9. The device of claim 1, wherein the keyboard component further comprises one or more fixed tension hinges and a rotating tension hinge rotationally engaged with the one or more fixed tension hinges.

10. The device of claim 9, wherein the rotating tension hinge further comprises an interface tab and the tablet component further comprises a slot configured to releasably engage the interface tab.

11. The device of claim 10, wherein the interface tab further comprises one or more connection traces and the slot in the tablet component further comprises one or more receptacles configured to communicatively engage the connection traces.

12. The device of claim 1, wherein the keyboard component lies in a plane and the counterbalance armature extends along the plane of the keyboard component.

13. The device of claim 1, wherein the counterbalance armature is forced to mechanically extend from the keyboard component as the tablet component moves into an open position with respect to the keyboard component.

14. A computer comprising
a computer component;
a keyboard component removably connected with the computer component, the keyboard component weighing less than the computer component and comprising a rotating tension hinge having a first engagement surface; and
a counterbalance armature attached to the keyboard component wherein the counterbalance armature is retractable with respect to the keyboard component and defines a second engagement surface and when the counterbalance armature is in a retracted position, the first surface interfaces with the second surface and prevents the computer component from being manipulated from a closed position to an open position.

15. The computer of claim 14, wherein the counterbalance armature is at least partially housed within the keyboard component when in a retracted position.

16. The computer of claim 15, wherein the keyboard component further comprises a housing that defines two or more slots and the counterbalance armature further comprises two or more rails that are respectively received and housed within the two or more slots.

17. The computer of claim 14, wherein the keyboard component further comprises one or more fixed tension hinges and a rotating tension hinge rotationally engaged with the one or more fixed tension hinges.

18. The computer of claim 17, wherein:
the rotating tension hinge further comprises a first engagement surface;
the counterbalance armature is retractable with respect to the keyboard component and defines a second engagement surface, and
when the counterbalance armature is at least partially housed within the keyboard component in a retracted position, the first engagement surface interfaces with the second engagement surface and prevents the computer component from being manipulated from a closed position to the open position.

19. A method comprising:
opening a computer component containing computer hardware with respect to a removably connected keyboard component lying in a plane, the keyboard component weighing less than the computer component, wherein the keyboard further comprises a rotating tension hinge having a first engagement surface;
extending a counterbalance armature with a second engagement surface retractably attached to the keyboard component, the counterbalance armature extending from the keyboard component along the plane when the computer component is connected with and in an open position with respect to the keyboard component; and
interfacing the first engagement surface with the second engagement surface to prevent the computer component from being manipulated from a closed position to the open position.

20. The method of clam 19, further comprising releasably engaging a slot on the computer component with an interface tab on a rotating tension hinge on the keyboard component.

* * * * *